UNITED STATES PATENT OFFICE.

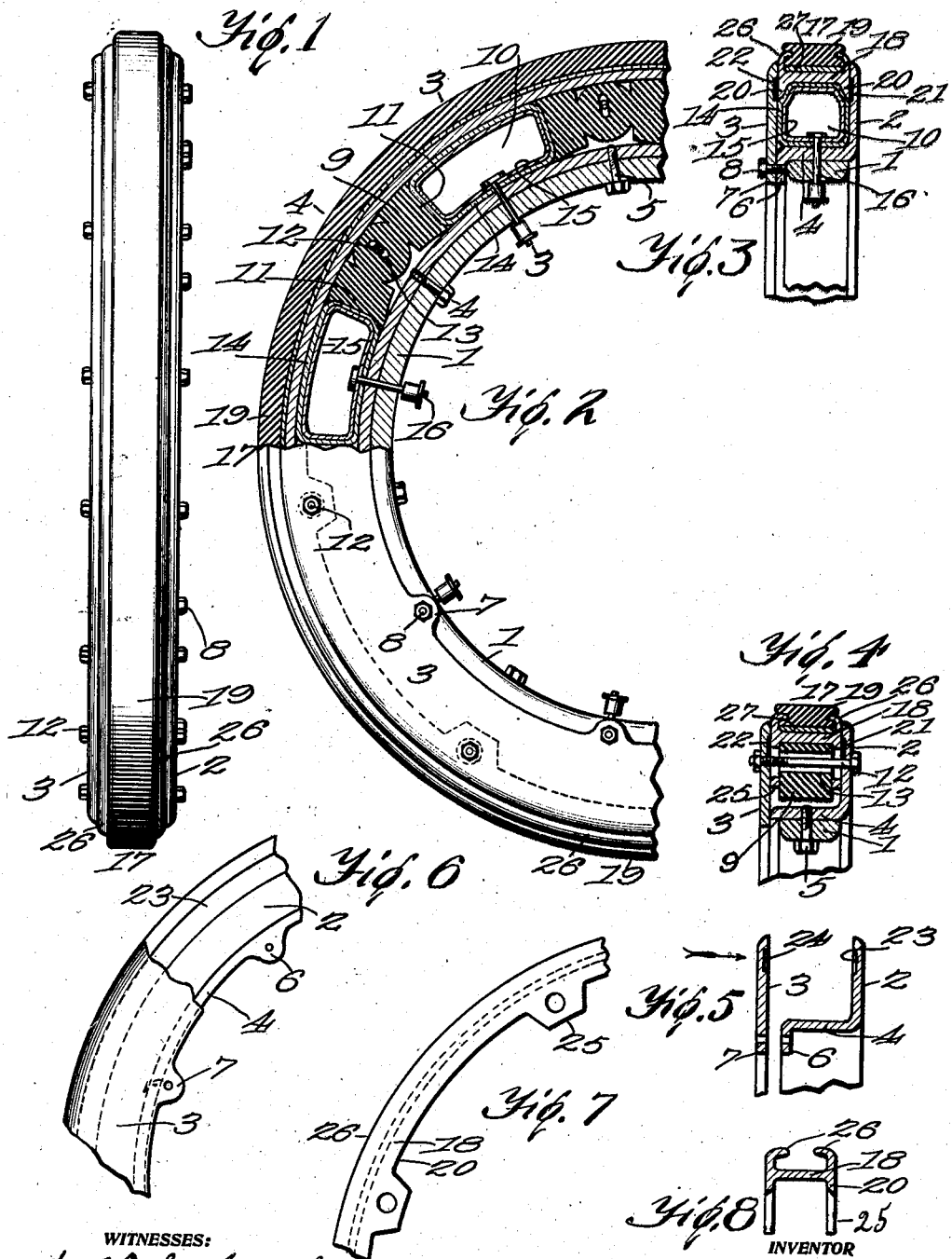

BENTO MARTINS DE SÁ, OF RIO DE JANEIRO, BRAZIL.

ELASTIC TIRE FOR VEHICLE-WHEELS.

939,327.          Specification of Letters Patent.          Patented Nov. 9, 1909.

Application filed March 2, 1908. Serial No. 418,913.

*To all whom it may concern:*

Be it known that I, BENTO MARTINS DE SÁ, a citizen of Brazil, residing at Rio de Janeiro, Brazil, have invented a new and useful Improvement in Elastic Tires for Vehicle-Wheels, of which the following is a specification.

This invention relates to improvements in elastic wheels of that character wherein the cushioning means is disposed in a manner to be out of contact with the road surface.

One of the objects of the invention is to provide a retaining device for receiving the cushioning means and disposing a tread portion within the retaining device and upon the cushioning means in a manner to permit free yielding action of the cushioning means responsive to movement of the tread portion with respect to the retaining device.

The invention will be more fully described in connection with the accompanying drawing and will be more particularly pointed out and ascertained in and by the appended claims.

In the drawing:—Figure 1 is a view in elevation looking at the tread portion of a wheel equipped with my invention. Fig. 2 is a fragmentary side elevation of a wheel with parts broken away. Fig. 3 is a sectional view on line 3—3 of Fig. 2. Fig. 4 is a sectional view on line 4—4 of Fig. 2. Fig. 5 is a sectional view of the retaining device. Fig. 6 is a side elevation of the parts shown in Fig. 5, looking in the direction of the arrow and with one of the members broken away. Fig. 7 is a side elevation of a part in the tread portion. Fig. 8 is a sectional view of the tread holder.

Like numerals of reference designate similar parts throughout the different figures of the drawing.

As shown the invention includes a felly 1 on which is disposed a retaining device preferably consisting of two parts designated by 2 and 3. The parts 2 and 3 form radially projecting portions or walls between which the remaining parts constituting the invention are disposed. The part 2 may conveniently consist of an angle ring so that the part 4 thereof can be utilized to secure the member 2 to the felly 1. Bolts 5 may be provided for securing the part 4 to the felly 1 as shown. The member 3 may be in the form of a clamping ring and I conveniently provide the members 2 and 3 with studs 6 and 7. The ring 3 may be clamped to the angle ring 2 by bolts 8 as shown.

The angle and clamping rings 2 and 3, when in place as shown in Fig. 3, form an annular receiving chamber in which cushioning means are disposed. As shown said cushioning means consist of a plurality of rubber elements, some of which are solid and the remainder of the pneumatic type. The solid and pneumatic cushioning elements may as shown be alternately disposed in the annular chamber formed by the members 2 and 3, the solid element being indicated at 9 and the pneumatic element at 10. I prefer to provide independent pneumatic elements so that when one of the same becomes deflated the remainder, together with the solid cushioning elements, will be relied upon to support the tread portion. As shown the solid elements 9 are arched so that the concave or convex or arched portion engages the tread member with the bases 11 of the arches in engagement with the pneumatic elements. Means are provided for holding the arched solid cushioning elements in their circumferential position and said means engage said elements in a manner to permit of yielding action thereof or in other words permitting the arched elements to be flattened. As shown bolts 12 extend through the members 2 and 3 and through slots 13 formed in said elements 9. The pneumatic elements 10 may consist of an outer sheath member 14 and an inner inflatable member 15, each element 10 being provided with independent means for inflation or deflation as indicated at 16.

A tread portion is provided and is indicated as a whole at 17 and may consist of a tread holder 18 and an elastic tread 19 held thereby. As shown said tread holder 18 is an annular part which fits within the radial walls of the members 2 and 3 and seats upon the solid and pneumatic cushioning elements. Said holder 18 advisably fits snugly between the walls 2 and 3 with a sufficient working clearance and it may be provided with inwardly projecting flanges 20 overlapping the pneumatic element 10 laterally as clearly shown in Fig. 3. In order to reduce frictional wear between the radial walls 2 and 3 and the tread holder 18, the former may be provided with packings 21 and 22 seated in annular grooves 23 and 24 formed in said walls 2 and 3. In order to limit displacement of the tread holder 18 with respect to the walls 2 and 3 said holder may be provided with apertured ears 25 arranged to lie against the sides of the solid cushioning elements 9 in registry with slots 13. By means of this construction the means for holding the solid cushioning elements loosely also serves for limiting displacement of the holder 18.

When the tread portion is formed in two parts as shown, the elastic element or tread 19 may be held in place by means of projecting annular flanges 26 which may be formed integral with the holder 18.

If desired a suitable non-metallic material such as papier-mâché indicated at 27, may be interposed between the tread 19 and the holder 18.

I claim:—

1. In an elastic vehicle wheel rim, the combination of a felly, a retaining device mounted thereon and comprising an angle ring seated on said felly and a clamping ring secured to said angle ring, a plurality of alternately disposed solid and pneumatic cushioning elements seated in said retaining device, a circular tread holder projecting into said device and seated on said elements, said holder having inwardly projecting angular flanges, and an elastic circular tread member engaged by said holder.

2. In an elastic vehicle wheel rim, the combination of a felly, a retaining device mounted on said felly and comprising laterally disposed radially projecting walls, a plurality of alternately disposed solid and pneumatic cushioning elements seated in said retaining device, a circular tread holder projecting into said device and seated on said elements, and an elastic tread portion engaged and retained by said holder.

3. In an elastic vehicle wheel, the combination of a retaining device comprising an angle ring and a clamping ring forming radially projecting walls, alternately disposed solid and independently inflatable cushioning elements disposed between said walls, a tread portion projecting between said walls and seated on said elements, and means engaging said walls, tread portion and certain of said elements to permit radial movement of said tread portion and elements with respect to said walls and prevent relative circumferential movement with respect to said walls, tread portion and certain of said elements.

In testimony whereof I affix my signature in presence of two witnesses.

BENTO MARTINS DE SÁ.

Witnesses:
J. T. DE CARVATHO COSTA,
C. BUSCHMANN.